May 26, 1931.    H. D. COLMAN    1,807,306
THERMOSTAT
Filed Jan. 21, 1928

Inventor
Howard D. Colman
By
Chindahl, Parker & Culver
Att'ys.

Patented May 26, 1931

1,807,306

UNITED STATES PATENT OFFICE

HOWARD D. COLMAN, OF ROCKFORD, ILLINOIS

THERMOSTAT

Application filed January 21, 1928. Serial No. 248,348.

This invention relates to improvements in thermostats and more particularly to thermo-responsive control devices such as are used with air heating systems for maintaining automatically predetermined temperature conditions of the air.

It is a known fact that susceptibility of the human body to warmth or cold is determined by the combined loss of body heat through radiation, convection and evaporation. Therefore to maintain a substantially constant body temperature or a uniform degree of comfort, an increase in the relative humidity of the air which produces a decrease in the loss of body heat by evaporation, must be compensated for by a decrease in the air temperature which is accompanied by an increase in the loss of body heat, by radiation and convection. Conversely, the lower the moisture content of the air, the higher must be the temperature for the same degree of comfort. It has been determined (see Am. Soc. of H. V. Engrs. Guide 1925) that a constant maximum degree of comfort exists at temperatures of 65, 70 and 75 deg. F. at relative humidities of approximately 95, 45 and 14 per cent respectively.

Based on the above principles, the present invention contemplates the provision of a new and improved automatic thermostat for governing the temperature of a body of air through the operation of a heating system, the thermostat having means responsive to changes in the humidity conditions of the air to which the thermostat is exposed and operable to vary the adjustment of the thermostat so that changes in the humidity of the air will be automatically compensated for by varying the predetermined temperature maintained by the thermostat, thereby maintaining a constant degree of comfort to persons exposed to the air heated by said system.

Another object of the invention is to provide a novel thermostat adapted for automatic adjustment by a humidity-responsive means and having means by which the adjustment of the thermostat may be effected manually without disturbing the relation of the humidity-responsive means to the thermostat.

Other objects and advantages of the invention will become apparent from the following detailed description of the invention taken in connection with the accompanying drawings in which.

Figure 1:
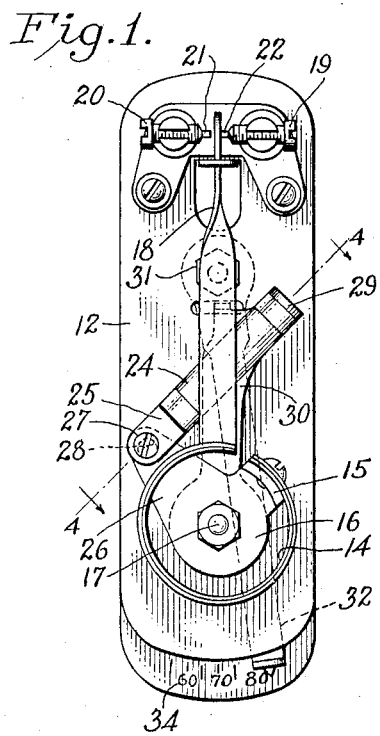
Figure 1 is a front elevational view of a thermostat embodying the features of the present invention, the protecting covering being removed.
Figure 2:
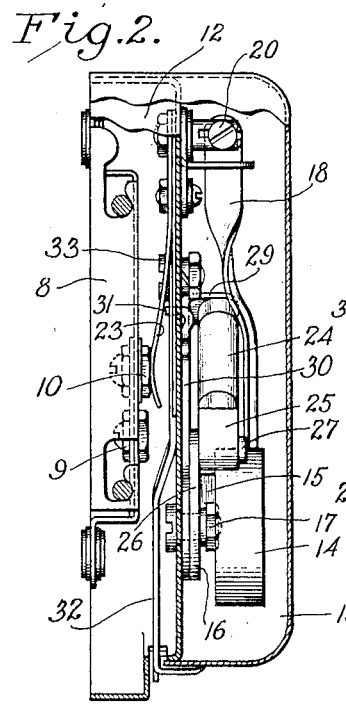
Fig. 2 is a side elevational view from the left in Fig. 1 with part of the enclosing casing broken away and shown in section.
Figure 4:
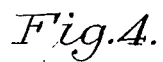
Fig. 4 is a detail sectional view along the line 4—4 of Fig. 1.
Figure 3:
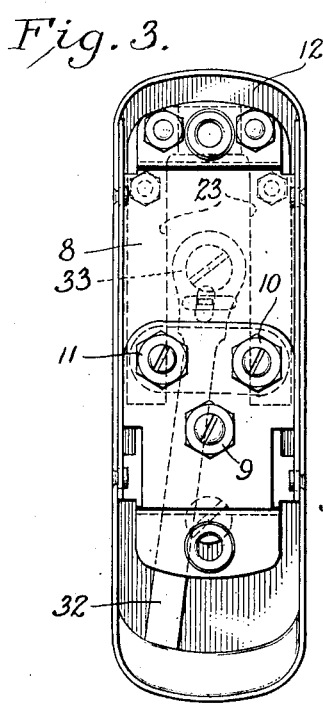
Fig. 3 is a rear elevational view.

While the invention is susceptible of various modifications and alternative constructions, I have shown in the drawings by way of illustration and will herein describe in detail the preferred embodiments, but it is to be understood that I do not thereby intend to be limited to the specific forms disclosed, but aim to cover all modifications and alternative constructions falling within the spirit and scope of the invention as expressed in the appended claims.

Generally stated, the invention contemplates the combination with an ordinary thermostat which is adapted to respond to temperature variations either above or below a predetermined point of means responsive to changes of humidity in the surrounding air and operable to change the position of the thermo-element or the means controlled thereby so that an increase in humidity will set the thermostat for the maintenance of a correspondingly lower temperature while a decrease in humidity will change the thermostat setting for a higher temperature.

In the exemplary form shown in Figs. 1 to 5, the invention is embodied in an open switch type of thermostat such as is often used for controlling air heating systems. This thermostat comprises a bracket member 8 adapted to be secured against a wall or other convenient support and having three terminal binding posts 9, 10 and 11 (Fig. 3) to which electric conductors leading to the heating system may be attached. Herein the terminal 9 is electrically connected to the bracket structure while the other terminals are insulated therefrom.

Removably mounted on the bracket 8 as by means of bayonet joint connections is a box-like enclosing frame 12 which supports a thermal element and the contact assembly cooperating therewith, these parts being protected by a casing 13. The thermo element may comprise a circularly formed bi-metallic strip 14 fixed at one end to a lug 15 on a member 16 which is pivotally supported on a stud 17 carried on the frame 12. Temperature changes in the air to which the strip is exposed cause a warping or bowing of the strip along its length and in a direction laterally of its length, thereby moving the free end of the strip.

The free end of the element has rigid therewith an upstanding contact arm 18 whose upper end is positioned between two adjustable contact points 19 and 20 and cooperates therewith to form two switches 21 and 22 which are closed upon movement of the switch arm 18 in opposite directions by the thermal element. To facilitate removal of the frame structure from the bracket, the electrical connections from the contact points 10 and 11 are made through the medium of spring arms 23 anchored and electrically connected at one end to the supports for the contact points and bearing at their other ends against the contact terminals 10 and 11. The relation of the two strips of the thermal element may be such as to cause a flexure of the element as a whole in a direction to close the switch 21 as the temperature of the surrounding air increases and to open the switch 21 and close the switch 22 as the temperature decreases. The switches 21 and 22, it will be noted, constitute control means which are comparable to the air pilot valve commonly associated with thermostats used in conjunction with pneumatic control systems for air conditioning equipment.

In accordance with the present invention, the setting of the thermostat may be varied by changing the position of the fixed end of the thermal element relative to its mounting, by changing the position of the contact points relative to their mounting or by changing the relation of the movable end of the thermal element to the switch arm 18 or other device actuated thereby. Preferably such adjustment of the thermostat is under manual control and also under the automatic control, the latter being effected by means which is capable of responding to variations in the moisture content of the air to which the thermostat is exposed. In the present instance, the humidity-responsive means comprises a cylindrically-formed block 24 of seasoned wood such as maple, which, as is well known in the art, swells in a longitudinal direction upon the absorption of moisture and contracts upon drying out, the dimensional change being proportional to the change of the relative humidity of the air.

The elongation and contraction of the block by an increase or decrease of humidity is utilized, in the embodiment of the invention shown in Figs. 1 to 5, to shift the member 16 angularly. To this end, a fitting 25 secured to one end of the block 24 is pivotally connected to an arm 26 on the member 16 through the medium of a pin 27 mounted eccentrically with respect to a stud 28. This eccentric relation provides for adjustment of the block relative to the thermal element.

The length of the arm 26 is so proportioned to the length and coefficient of the expansion of the block 24 that the expansion or contraction thereof by humidity changes will set the thermostat automatically for the maintenance of a uniform degree of comfort. That is to say, the position of the thermal element will be changed so as to vary the predetermined temperature at which the thermostat responds in such increments that the air under the changed conditions of the humidity and constant temperature will produce the same feeling of comfort as under the combined humidity and temperature conditions formerly existing. For example, if the thermostat is initially set to maintain a temperature of 70 deg. F. when the relative humidity is 45 per cent, a decrease of humidity to 14 per cent would, through the medium of the block 24, cause the thermostat to be set for the maintenance of 75 deg. F. Likewise with an increase of humidity to 95 per cent, the thermostat would be automatically adjusted for a maintenance of the air at 65 deg. F.

To provide for manual adjustment of the thermostat to vary at will the predetermined temperature to be maintained, the other end of the block 24 is secured to a lug 29 on an adjustable plate 30 also pivoted on the stud 17. This plate has a lug 31 projecting through a slot in the frame 12, the lug 31 being engaged by an oscillatory spring arm 32 which is pivoted at 33 on the frame and normally maintained in set position by a frictional engagement with the frame. The arm 32 projects downwardly through the frame for manipulation in either direction to change the predetermined temperature, a scale 34 representing temperatures being provided to enable the degree of adjustment to be properly gaged. By swinging the arm 32 in either direction, the position of the switch arm 18 may be changed relative to the switch contacts without disturbing the adjusted relation of the thermal element and the humidity responsive means.

To summarize the operation of the present control device, let it be assumed that the manually adjustable arm 32 has been set for a temperature of 70 deg. F. and the eccentric stud 27 has been set so that the thermostat will maintain that temperature when the air is approximately 45 per cent saturated. Under such conditions, the switch 21 would be closed by the movement of the thermal element when the temperature rises above 70 degrees and the switch 22 would be closed when the temperature falls below 70 deg. Now when the air becomes drier, for example 14 per cent saturated, the block 24 contracts thereby shifting the arm 26 in a clockwise direction as viewed in Fig. 1. Accordingly the thermal element and the switch arm 18 are moved toward the contact 19 so that under the new humidity conditions a higher temperature will be maintained because a greater movement of the thermal element is required to move the switch arm away from the contact point 19. Conversely when the air is very moist, for example 95 per cent saturated, which would cause considerable expansion of the block 24, the member 16 would be shifted in a counter-clockwise direction as viewed in Fig. 1, the result being to adjust the thermal element so it would hold the switch arm against the contact point 20 so long as the temperature remains above 65 deg. F.

It will be observed that the adjustment just described takes place automatically and is not affected in any way by the independent manual adjustment of the thermostat for the maintenance of different predetermined temperatures. In other words, the arm 32 may be set manually for the maintenance of any basic temperature that may be desired, and the humidity-responsive means will set the thermostat automatically on the basis of such manual adjustment.

Figure 6:
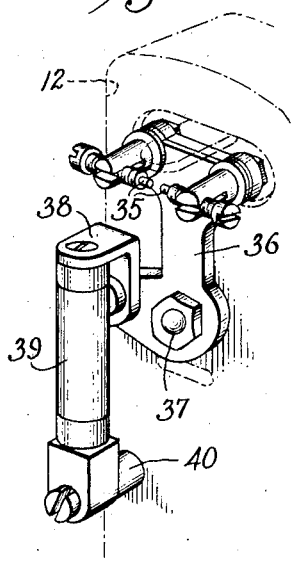
Fig. 6 is a fragmentary perspective view of another form of the invention.
Figure 5:
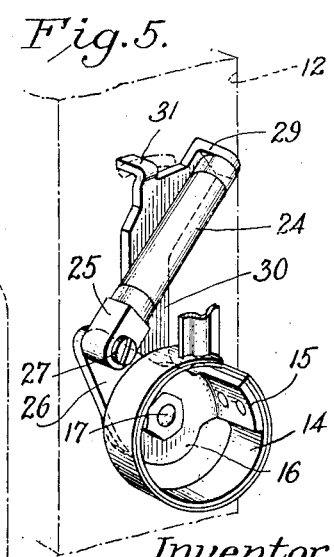
Fig. 5 is a fragmentary perspective view showing the arrangement of the thermo and humidity responsive elements.

In the form of the invention shown in Fig. 6 the automatic adjustment of the thermostat by the humidity-responsive means is effected by moving the contact points 35 which cooperate with the switch arm carried by the thermal element, the same as is shown by Figs. 1 to 5. To this end, the contact points are mounted on the upstanding arm of a bell-crank member 36 pivoted at 37 on the thermostat frame. The bell-crank has a horizontally extending arm which is pivotally connected through a fitting 38 to one end of a wooden block 39, the other end being normally held by an eccentric stud 40. With this construction it will be seen that a swelling of the block 39 due to an increase in moisture content of the air causes the contacts to be shifted in one direction relative to the switch arm while any contraction of the block will shift the contact points in the opposite direction.

With the control device thus provided, a person in the room the temperature of which is to be controlled may, through the medium of the arm 32, adjust the thermostat for the maintenance of whatever temperature feels comfortable to him without regard to the relative humidity then existing and thereafter the thermostat will be adjusted automatically to compensate for humidity changes. Thus, a uniform degree of comfort that will suit any individual will be maintained at all times.

I claim as my invention:

1. A control thermostat for a temperature regulating system, comprising, in combination, a thermal element having an adjustable mounting, control means actuated by the movement of said element upon temperature changes in the air to which the element is exposed, a member whose dimensions change upon the absorption and loss of moisture, and means for communicating the dimensional changes of said member to the mounting for said element whereby to change the operative position of the latter.

2. A control thermostat for temperature regulating systems comprising, in combination, thermo-responsive means comprising an elongated bimetallic strip supported at one end and adapted to be flexed laterally of its length with changes in the temperature of the air to which the strip is exposed so that movement will be imparted to the free end of the strip, means controlled by movement of the free end of the strip upon heating and cooling, an elongated block of material adapted to expand and contract in a longitudinal direction upon the absorption of moisture from and the loss of moisture to the surrounding air, and means by which the elongation and contraction of said block are utilized to vary the operative relation of said thermoresponsive and controlled means whereby to set the thermostat automatically for response to a lower temperature when the relative humidiy of the air increases and for response to a higher temperature when the relative humidity decreases.

3. A heat regulating device comprising, in combination, a base, an electric contact mounted thereon, a bell-crank pivoted on said base to swing about a fixed axis, a coiled bimetallic thermal element having one end rigid with one arm of said bell-crank, means rigid with the other end of said thermal element and cooperating with said contact to form a control switch, and a humidity responsive element associated with the other arm of said bell-crank and acting to swing said thermal element about said axis and thereby vary automatically the temperature at which said switch will be opened and closed by said thermal element.

4. In a control thermostat, the combination of a control switch, two levers fulcrumed for movement relative to each other about a common axis, a thermo-responsive element having one end rigid with one of said levers and the other end arranged to control the opening and closing of said switch, an element whose dimensions change with changes in the relative humidity to which the element is exposed, said last mentioned element being interposed between said levers to effect relative movement therebetween, and manually operable means for actuating the other lever to effect conjoint movement of both levers whereby to change the temperature at which said switch will be opened and closed by said thermo-responsive element.

In testimony whereof, I have hereunto affixed my signature.

HOWARD D. COLMAN.